United States Patent [19]

Kappel et al.

[11] Patent Number: 5,238,501
[45] Date of Patent: Aug. 24, 1993

[54] METHOD FOR TREATMENT OF A FIBROUS MATERIAL-FLUID MIXTURE

[75] Inventors: Johannes Kappel, Graz; Franz Petschauer, Lannach, both of Austria

[73] Assignee: Maschinenfabrik Andritz Actiengesellschaft, Graz, Austria

[21] Appl. No.: 545,949

[22] Filed: Jun. 29, 1990

[30] Foreign Application Priority Data

Jul. 3, 1989 [AT] Austria ..................... 1617/89

[51] Int. Cl.⁵ ..................... B08B 1/02; D21C 9/18
[52] U.S. Cl. ..................... 134/15; 134/21; 134/26; 134/34; 8/156; 68/44; 162/60; 210/391; 210/400; 210/456
[58] Field of Search ..................... 162/60; 210/391, 400, 210/456, 783; 134/15, 21, 26, 32, 34, 36; 68/44, 45, 205 R; 8/156

[56] References Cited

U.S. PATENT DOCUMENTS

| | | | |
|---|---|---|---|
| 1,790,714 | 2/1931 | Mantius | 122/398 |
| 2,337,068 | 12/1943 | Simpson et al. | 68/45 |
| 3,564,631 | 2/1971 | Burling | 162/60 |
| 3,601,039 | 8/1971 | Schovel | 210/400 |
| 4,014,736 | 3/1977 | Sexton | 162/38 |
| 4,046,621 | 9/1977 | Sexton | 162/60 |
| 4,154,644 | 5/1979 | Evidsson | 162/60 |
| 4,608,122 | 8/1986 | Klein et al. | 162/60 |
| 4,879,034 | 11/1989 | Bastgen | 210/400 |
| 4,900,400 | 2/1990 | Gudmundsson et al. | 162/60 |

FOREIGN PATENT DOCUMENTS

| | | |
|---|---|---|
| 0178271 | 4/1986 | European Pat. Off. |
| 0251787 | 1/1988 | European Pat. Off. |
| 3024711 | 1/1982 | Fed. Rep. of Germany ...... 210/400 |
| 2166660 | 5/1986 | United Kingdom. |

*Primary Examiner*—Theodore Morry
*Assistant Examiner*—Saeed T. Chaudhry
*Attorney, Agent, or Firm*—Roylance, Abrams, Berdo & Goodman

[57] ABSTRACT

The invention relates to a method and device for the washing of a medium consistency fibrous slurry, especially a chemical pulp slurry in which the slurry is fed at an inclined angle onto a substantially horizontal portion of circulating filter belt, and then distributed over substantially the entire working width of the filter belt. The distributed slurry is then washed with a washing liquid under localized pressure to produce a slurry having a medium consistency range, i.e., about 8 to 15 percent. In order to increase the consistency to 20 to 40 weight percent, preferably about 30 to about 35 weight percent, the washed slurry is passed to a pressing zone.

12 Claims, 1 Drawing Sheet 5,238,501

METHOD FOR TREATMENT OF A FIBROUS MATERIAL-FLUID MIXTURE

FIELD OF THE INVENTION

The present invention relates to a method and a device for washing a fibrous material-fluid mixture particularly a fibrous slurry, especially a chemical pulp slurry, which can be used in combination with a bleaching method, in which the pulp slurry is conveyed through one or more treatment zones by means of a single circulating filter belt. The treatment zones include a distribution zone and a downstream washing zone operated under a differential pressure continuously applied to the slurry.

BACKGROUND OF THE INVENTION

It is known both after pulping stages and also before and between separate bleaching stages that it is necessary to rinse out impurities which have been dissolved out of the wood or fibrous material during cooking or bleaching and to wash the added chemicals and/or reaction products out of the chemical pulp, in order to avoid undesirable properties in the final chemical pulp and to avoid polluting the environment.

At the present time the following basic different types of chemical pulp washers are known:
1) Drum washers with vacuum filter, CB-filter and pro-feed washers.
2) Belt washers with a filter belt or using the double wire press technique.
3) Washing presses or press washers, in which the pulp is dewatered only to a certain level of dry content.
4) Diffusers: these allow for constant consistency by displacement washing in a tower.

Since the incorporated wash water must be concentrated by evaporation, one is forced to obtain maximum volumes of the portions extracted from the wood during the cooking process and the chemicals which have been added with maximum attainable concentration, and with use of as small volumes of wash water as possible.

Drum washers, belt washers and wash presses have the drawback that the material is fed in at relatively low consistency (1-5 weight percent based on dry solids content). Not until after a preliminary dewatering procedure does the actual washing process begin. The outlay in terms of intermediate tanks and pumps is relatively great. Since conventional diffusion washers are subjected to longer durations of operation and higher temperatures, they can be operated with a pulp consistency of only 10 to 12 weight percent.

Bleaching installations for chemical pulp materials today run mostly in the medium consistency range (8 to 15 weight percent), and some stages, for example, using ozone, can be carried out in the high consistency range. At this time there is no washing system which on the one hand operates entirely in the medium consistency range while also attaining a high output consistency.

SUMMARY OF THE INVENTION

The system of the present invention involves initially introducing a fiber-fluid mixture, principally fibrous material, especially a chemical pulp slurry, with a medium consistency, for instance from 8 to 15 weight percent, entirely from above and at an angle to the substantially horizontal top portion of a circulating filter belt. The slurry is then distributed on the filter belt over substantially the entire filter belt width and is then dewatered by use of localized pressure. This system provides a dewatered product in the medium consistency range of, for example, 8 to 15 weight percent or in the high consistency range of, for example, 20 to 40 weight percent, preferably, 30 to 35 weight percent. If it is desired to increase the consistency to, for example, 20 to 40 weight percent, especially 30 to 35 weight percent, the dewatered slurry is fed through a further dewatering zone, especially a press zone following the aforesaid dewatering zone.

The new method above all has the advantage that it can be economically effective in providing an output both in the medium consistency range and in the high consistency range.

Thus, it is advantageous that initially the mixture or slurry is fed through a channel which is advantageously vertical or angular with respect to the direction of movement of the filter belt. The fibrous material which is fed is distributed uniformly over the entire width of the filter belt, in order to be able to carry out the subsequent treatment as efficiently as possible. Therefore as seen from the direction of movement of the belt, a distribution device, especially a distribution roller, is arranged directly following the discharge mouth of the channel in order to bring about uniform distribution of the fibrous material over the entire width of the filter belt. Downstream from the distribution roller is a washing zone in which one or more inlets for the treatment medium are located above the belt. In the washing zone, devices for the production of a differential pressure, especially vacuum pressure devices, are provided in order to accelerate fluid discharge from the slurry. This differential pressure, preferably vacuum pressure, can be provided as needed from the pressure of the wash water, a compressor, a vacuum system or through a freefall vacuum suction system or suction apparatus.

Accordingly, to carry out the method of the invention, it is advantageous to provide a closed inlet for the mixture or suspension, opening at the discharge on a circulating filter belt, preferably dropping precipitously, especially a channel-like inlet arranged at an inclined angle, e.g., vertically to the filter belt. A distribution device, especially a roller, is provided nearly or directly in the path of the belt downstream from the inlet and arranged over the entire width of the belt for distribution of the mixture or slurry over the width of the belt. Following the distribution device one or more inlets for the treatment fluid, preferably a washing fluid, are positioned over the belt in a washing zone. In the washing zone, differential pressure is provided over the belt, preferably by means of vacuum pressure, wash water pressure, a compressor, vacuum systems or freefall vacuum suction systems.

It is advantageous to provide the distribution rollers with a smooth covering. To strengthen the effect of the distribution roller, however, the surface of this roller can also be provided with a specially shaped profile. For instance, the distribution roller, which advantageously driven in the opposite direction from that of the belt, can have grooves or splines on the covering for the purpose of aiding the effect of distribution. Such splines or grooves preferably consist of two halves each, wherein each half runs along the distribution roller covering from the center of the covering to the hub of the rollers at an angle. In the center of the covering these spline or groove halves meet at an angle of less than 180°, especially an obtuse angle, with each other and an acute angle in the direction of movement of the roller.

Research has shown that generally the distribution rollers described above are most suitable with a smooth covering. The use of distribution rollers covered with a filter could also be advantageous.

According to one advantageous configuration of the invention, the treatment fluid, especially washing fluid, is fed in by means of trays arranged above the belt portion, to the mixture or suspension to be treated, and a guide plate or the like directed toward the belt portion can be provided on the tray edge located near the inlet of the mixture or suspension. Such guide plates or spillways can also be provided on both sides of the trays.

According to the invention, it is advantageous for the purpose of increasing the consistency to for instance 20 to 40 weight percent, especially 30 to 35 weight percent, for the treated, especially washed, mixture or slurry to be guided after passage through the treatment or washing zone through a further dewatering zone, especially a pressing zone or the like. By means of these additional pressing zones the medium consistency (8 to 15 weight percent) slurry can be brought up to a high consistency of for instance 20 to 40 weight percent and is thus, for example, best suitable for certain bleaching methods. For this purpose, according to a further embodiment of the invention, following the washing zone, a dewatering zone is provided, preferably a pressing zone or the like, which can be a second filter belt positioned above the above described first filter belt. The treated or washed material is further conveyed under compression between the two filter belts. The pressing zone can thus be formed so that a guide roller for the upper filter belt is positioned tight against a guide roller for the lower filter belt so that the fluid can be effectively pressed out of the slurry. The dewatering or pressing zone can also consist of one or more S-shaped filter turns guided around rollers and/or of one or more pressnips.

The driving force for the washing is produced by a differential pressure, preferably vacuum pressure. This differential pressure, especially vacuum pressure, can be supplied as needed through pressure from the washing water, a compressor, a vacuum system or through free-fall vacuum suction system or suction apparatus. For use in the medium consistency range this represents a simple and low-cost solution. According to the invention, at least partially open suction or vacuum pressure boxes are provided advantageously below the top portion of the filter belt in the washing zone.

European Application EP-0 178 271 describes a device for treatment of pulp in which the pulp is fed from a head box to a fluid-permeable endless belt over which is provided an inlet for the supply of treatment liquid to the belt. In this known device, however, there is no indication whatsoever that initially the fibrous material-fluid mixture, principally fibrous material, particularly a pulp suspension, with a medium consistency, for instance from 8 to 15 weight percent, is fed in its entirety to the discharge of the nearly horizontal top portion of a circulating filter belt from above and then the fibrous material-fluid mixture is distributed directly following this discharge on the filter belt over the entire width of the belt. Thereafter, by use of localized differential pressure and washing, a pulp in the medium consistency range of, for example, 8 to 15 weight percent is produced. A pulp in the high consistency range of for instance 20 to 40 weight percent, preferably 30 to 35 weight percent, may be produced using a subsequent dewatering zone, especially a pressing zone. This requires a device of greater length. The same is true for a method known from the disclosure of U.S. Pat. No. 4,014,736, in which the mixture is additionally diluted before application.

The input material is also first diluted or thinned in British Patent 2 166 660. Again, an initial distribution roller is not provided. A roller present in the inside of the installation serves only as dewatering roller. Also, vacuum pressure is not disclosed. In any case it has to do once again with a device of considerable length.

The device of European Patent Application 0 251 787 has a structure basically different from the present invention. The material to be dewatered is fed to an endless belt from the inside, in a wedge-shaped area between belt and a roller. There is likewise no disclosure of a vacuum pressure zone nor an economical method of operation.

In U.S. Pat. No. 1,790,714, material to be washed is subjected to the first of a total of five belts without application of pressure. Not until later is the material passed between a second and a third belt. Thus, there is once again no distribution of the mixture according to the present invention over the entire width of the filter belt directly to the rear of the discharge. There is also no disclosure of a differential pressure.

BRIEF DESCRIPTION OF THE DRAWINGS

The invention is to be explained hereinafter relative to the exemplary diagrammatic drawings.

In the drawings.

DESCRIPTION OF THE PREFERRED EMBODIMENTS

Figure 1:
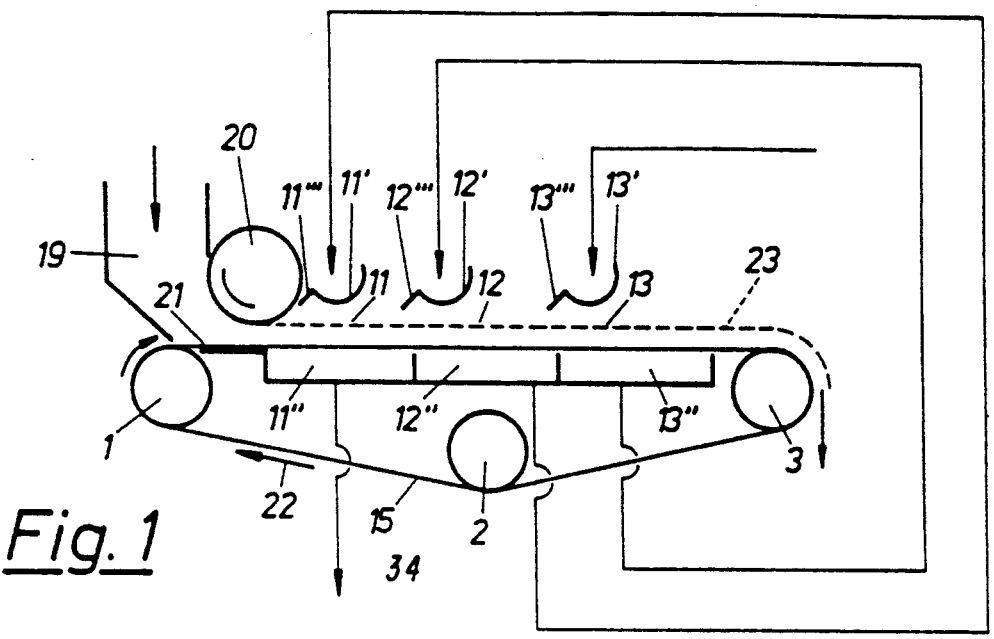
FIG. 1 is a vertical longitudinal cross section through a device for the treatment of fibrous material-fluid mixtures, especially chemical pulp suspension, according to the invention.

If a medium consistency output is desired, a device as shown in FIG. 1 can be used. The fibrous material mixture or slurry is applied through a channel 19 that is positioned vertically, i.e., at an inclined angle to the direction of movement of the substantially horizontal belt (shown by arrow 22) onto the belt feed section 21. Circulating endless filter belt 15 serves to further convey the material which it carries and passes over three guide or drive rollers 1, 2 and 3. Directly following belt feed section 21 is a distribution roller 20 arranged over belt 15 to provide uniform distribution of material over the working width of the belt. The upper boundary or surface of the suspension is indicated as 23. One or more treatment zones 11, 12 and 13 are provided over filter belt 15 downstream from distribution roller 20, whereupon the fibrous material mixture or slurry is subjected to washing treatment. Each of these zones has a tray 11' or 12' or 13' for inlet of the washing fluid over filter belt 15 and a suction box 11", 12" or 13" beneath belt 15. These trays advantageously have guide plates 11''', 12''' or 13''' at their front edges for directing the water at an inclined angle and in a countercurrent direction to that of belt 15. Washing liquid is supplied to trays 11', 12' and 13' by means of lines 28, 30 and 32, respectively. Fresh washing liquid, such as water or water with chemical additives, is supplied by means of line 32, while washing liquid is recycled by means of line 28 from suction box 12" and by means of line 30 from suction box 13" and spent washing liquid is withdrawn by means of line 34 from suction box 11". After passage through treatment zones 11, 12 and 13, a fibrous material mixture or suspension in the medium consistency range is obtained.

Figure 2:
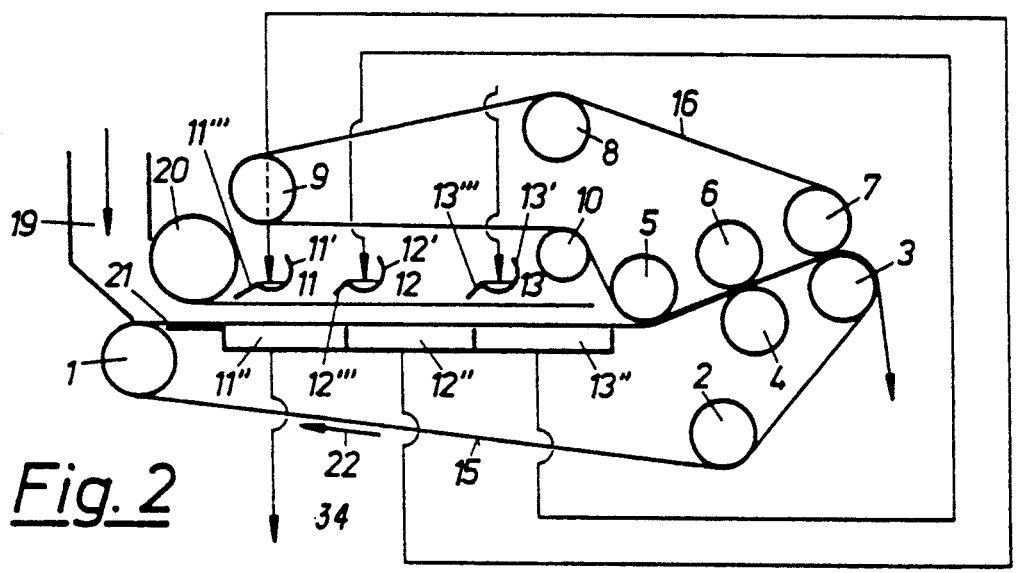
FIG. 2 is analogous to FIG. 1 and is a vertical longitudinal cross section of the installation according to the invention, but with an additional top filter belt and an additional press section.

For certain uses, especially with certain bleaching methods for chemical pulp, a high consistency output may be required. In such event the device of FIG. 1 can be expanded as shown in FIG. 2. As is shown in FIG. 2, the fiber mixture or suspension is applied through channel 19 vertically, i.e., at an inclined angle to the direction of movement of the belt onto the belt feed section 21. Filter belt 15 in this case also serves to further convey the material, but passes over four guide or drive rollers 1, 2, 3 and 4. Likewise, directly after feed section 21, a distribution roll 20 is provided, to uniformly distribute the applied material over the entire working width of the belt. Also in this configuration, one or more treatment zones 11, 12 and 13 are provided above filter belt 15 downstream of distribution roller 20, whereupon the fibrous material or slurry can be subjected to further treatment. However, in the invention of FIG. 2, a top filter belt 16 is guided in a parallel manner to filter belt 15 in a pressing zone provided by the two belts. Top filter belt 16 is guided or moved by means of guide or drive rollers 5 to 10.

According to the invention it is advantageous for two guide rollers of belt filter 15 and of top belt filter 16, namely, guide rollers 4 and 6 as well as guide rollers 3 and 7, to be as close together as possible. Thus, in the press section from rolls 5 to 7, top filter belt 16 and bottom filter belt 15 are separated from one another only by the pressed material, so that the fluid can be pressed very effectively out of the fiber material mixture or suspension. The pair of rollers 4, 6 or 3, 7 thus form pressnips. The remaining features of FIG. 2 are operated in the same manner as in FIG. 1.

Figure 3:
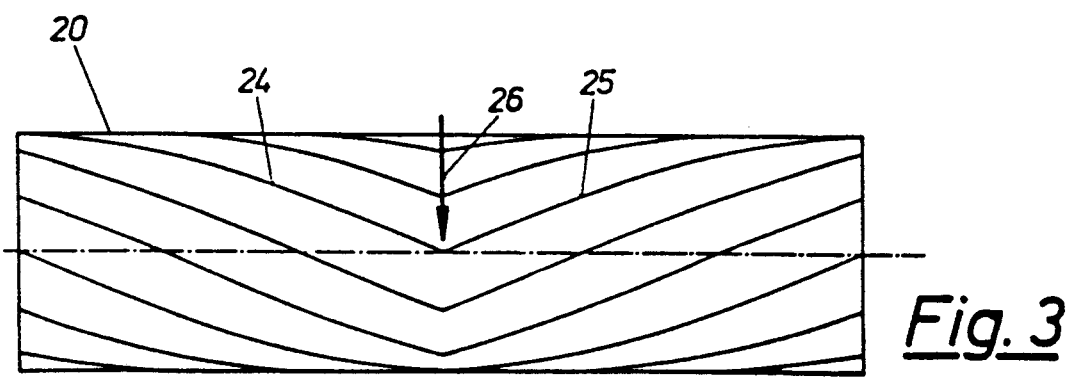
FIG. 3 is the plan view of the distribution roller of the present invention.

FIG. 3 shows a plan view of a configuration of distribution roller 20 according to the invention. The surface of this roller includes splines or grooves 24, 25, advantageously driven in the opposite direction from the movement of the belt. Splines or grooves 24, 25 each consist of two halves 24, 25, of which each runs on the distribution roller covering from the center of the covering to the hub of the roller at an angle. In the center of the covering these splines or grooves meet at an angle of less than 180°, especially an obtuse angle, with each other and incorporate an acute angle in the direction of rotation of roller 20 (arrow 26).

What is claimed is:

1. A method for the treatment of a fibrous slurry having an initial medium consistency which comprises
    passing a feed slurry in its entirety onto a first endless filter belt from above, at an inclined angle with said filter belt;
    immediately thereafter passing the deposited slurry on said filter belt through a distribution zone in which said slurry is distributed substantially across the entire working width of said filter belt by applying a locally limited distributing pressure to said slurry, said distributing pressure being limited solely to said distribution zone;
    passing the distributed slurry to a washing zone in which said slurry is contacted with a washing liquid while under a differential pressure for removal of impurities from said fibrous slurry; and
    withdrawing the washed slurry from said washing zone, said washed slurry having a reduced impurity content.

2. The method of claim 1, wherein said feed slurry comprises chemical pulp having a consistency in the range of from about 8 to about 15 weight percent.

3. The method of claim 1, wherein said distribution zone comprises a distribution roller.

4. The method of claim 3, wherein said distribution roller rotates in a direction counter to said endless filter belt.

5. The method of claim 1, wherein said distributed slurry is contacted in said washing zone by washing liquid in a plurality of washing steps while under vacuum.

6. The method of claim 5, wherein said washing liquid contacts said slurry on said filter belt at an inclined angle to said filter belt and in a direction counter to said filter belt.

7. The method of claim 1, wherein said withdrawn washed slurry has a medium consistency.

8. The method of claim 1, wherein said washed slurry is passed to a press section for further dewatering.

9. The method of claim 8, wherein said washed slurry is passed between two endless filter belts while said filter belts pass through rollers in a nip-defining relation in said press section.

10. The method of claim 8, wherein said feed slurry has a consistency in the range of from about 8 to about 15 weight percent and the slurry withdrawn from said press section has a consistency in the range of from about 20 to about 40 weight percent.

11. The method of claim 1, wherein said feed slurry is passed onto said filter belt through a closed inlet.

12. The method of claim 1, wherein said feed slurry is passed onto said filter belt through a substantially vertical channel.

* * * * *